United States Patent [19]

Shapiro

[11] Patent Number: 4,750,373

[45] Date of Patent: Jun. 14, 1988

[54] ADJUSTABLE VOLUME, PRESSURE-GENERATING PIPETTE SAMPLER

[76] Inventor: Justin J. Shapiro, Labindustries, Inc., 620 Hearst Ave., Berkeley, Calif. 94710-1992

[21] Appl. No.: 6,701

[22] Filed: Jan. 22, 1987

[51] Int. Cl.[4] .................................... G01N 1/00

[52] U.S. Cl. .................... 73/864.87; 73/864.18; 422/100

[58] Field of Search ........... 73/864.13, 864.14, 864.18, 73/864.21, 864.87, 864.85, 863.23; 422/100; 222/309, 287; 604/208, 211

[56] References Cited

U.S. PATENT DOCUMENTS

| | | | |
|---|---|---|---|
| 197,017 | 11/1877 | Lolmer | 604/211 |
| 3,248,950 | 5/1966 | Pursell et al. | 73/864.18 |
| 3,334,788 | 8/1967 | Hamilton | 73/864.18 |
| 3,512,944 | 5/1970 | Craig et al. | 422/100 |
| 3,563,240 | 2/1971 | Silver | 604/211 |
| 3,675,492 | 7/1972 | Tejera | 73/425.6 |
| 3,831,602 | 8/1974 | Broadwin | 222/309 |
| 3,846,077 | 11/1974 | Ohrnger | 422/100 |
| 4,001,212 | 7/1986 | Shapiro | 73/864.18 |
| 4,020,698 | 5/1977 | D'Autry | 73/425.6 |
| 4,084,730 | 4/1978 | Franke et al. | 222/309 |
| 4,117,728 | 10/1978 | Johnson | 73/425.6 |
| 4,414,857 | 11/1983 | Brazhnikov et al. | 73/864.87 |
| 4,526,294 | 7/1985 | Hirschmann et al. | 222/47 |
| 4,554,134 | 11/1985 | Tervamaki et al. | 422/100 |
| 4,591,072 | 5/1986 | Oshikubo | 222/44 |

OTHER PUBLICATIONS

Article by Ronald E. Majors, entitled, "Sample Preparation for HPLC and Gas Chromatography Using Solid-Phase Extraction", vol. 4, No. 10 of LG-GC.

*Primary Examiner*—Stewart J. Levy
*Assistant Examiner*—Robert R. Raevis
*Attorney, Agent, or Firm*—Browdy and Neimark

[57] ABSTRACT

An adjustable volume pipette sampler and pressure-generating device comprises a barrel slidably and rotatably containing a cross-shaped plunger of radial flanges which is manually rotatable around its axis in the barrel, at least one of the radial flanges having open-ended slots or notches. A stop disc is rigidly secured on the top flange of the barrel in such a manner that it does not interfere with the vertical motion of the plunger shaft when its axial position is such that adjacent flanges of the plunger straddle the stop disc. Otherwise, the stop disc cooperates within the notches to stop vertical movement of the plunger at a selected position corresponding top a selected pipette volume.

17 Claims, 5 Drawing Sheets

ADJUSTABLE VOLUME, PRESSURE-GENERATING PIPETTE SAMPLER

FIELD OF THE INVENTION

The present invention relates to pipette samplers, more particularly adjustable volume pipette samplers equipped with precision means for accurately and rapidly dispensing and/or aspirating high precision volumetric quantities of liquid, constituting self-contained pressure-generating means for use in dispensing samples in conjunction with high performance liquid chromatography (HPLC), gas chromatography (GC), absorption columns, filters or whenever a measured reagent sample or the like must be forced into another device under an initial known pressure, particularly without constant monitoring by an operator or technician. The present device in essence is a sampling and pressure generating device easily connected to filters, absorption columns, chromatography columns, or wherever a measured reagent sample must be forced into another device under continuous known pressure, unattended.

BACKGROUND OF THE INVENTION

Pressure generating devices for forcing reagents through filtering devices, absorption and chromatography columns have been in existence for many years. Most are expensive; some are motor pump operated and thus constitute complex systems. With the proliferation of small columns and cartridge filters for specific tests and analyses, a need has been created for a small, simple and inexpensive device to drive reagents through columns and filters. Sometimes a hand-held syringe or similar device can immediately pass a reagent through a column or filter (see U.S. Pat. No. 3,512,940) but very often the column is tightly packed or the filter has such a fine porosity that it becomes time consuming and tedious to use a hand-held syringe in this way.

Much of the developmental work in sample preparation for high performance liquid chromatography (HPLC), gas chromatography (GC) or filtration has been focused on increasing the speed, sensitivity, and efficiency of the techniques. Many of the classical techniques, such as centrifugation, dialysis and distillation, are labor-intensive, cumbersome, and prone to sample loss caused by multi-step manual manipulations.

Adjustable volume pipette samplers or syringes have been well known for years and are generally utilized in laboratories and medical facilities for accurately dispensing and/or aspirating precise volumes of samples including reagents, liquids to be sampled or analyzed, etc., particularly for use during HPLC, GC or other like sample preparation filtering processes. Many of these pipette devices include plunger stop-means, either integrally a part of the barrel of the pipette or adjacent the plunger, to limit the downward travel of the plunger, thus permitting an operator to dispense a precise volumetric quantity of liquid sample. Additionally, the prior art includes pipette samplers having axially adjustable barrels to permit the volumetric size of the barrel to either increase or decrease in volume capacity.

For example, U.S. Pat. No. 4,601,212 to the present inventor discloses a precision micropipettor including stop-means integral with the barrel finger flange to limit the downward and upward movement of the plunger by incorporating a longitudinally extending cut-away portion in the plunger, the cut-away portion acting to stop the plunger when the cut-away portion shoulders or ends abut with a horizontally extending pin embedded in the barrel finger flange. This device, while being an excellent product, does not permit delivery of a sample under pressure over time without constant attention by an operator or technician.

U.S. Pat. Nos. 3,675,492 to Tejera; 4,084,730 to Franke et al; and 4,117,728 to Johnson all disclose adjustable volume pipettes or syringes which include notched or stepped elements to limit upward or downward travel of the plunger, thereby allowing for the precise dispensing of a known volumetric quantity of liquid. However, these devices are unduly complex in structure as the Franke et al device, difficult to manufacture as the Tejera device, or both as the Johnson device. These devices also do not fully provide for limiting both upward and downward plunger movement, and in general do not permit delivery of a sample under pressure over a time span without operator attention.

The U.S. Pat. No. 4,526,294 to Hirshmann et al shows an axially adjustable barrel to limit the displacement of the plunger shaft reciprocally held therein; this device, also very structurally complex, suffers from many of the deficiencies noted above and below. Other patents disclosing devices of interest include Tervamaki et al U.S. Pat. Nos. 4,554,134; Oshikubo 4,591,072; and D'Autry 4,020,698.

While the above-mentioned patents show pipetting devices or the like having adjustable volume capabilities, at least most need extra mechanisms or devices to facilitate limiting of the plunger axial movement, and are expensive and cumbersome particularly when employing disposable type pipette samplers or syringes. Furthermore, no prior art pipette sampler is provided with self-contained or built-in pressure-generating means for forcing the sample into a filtering device or column, such as for use in conjunction with HPLC or GC, under a continuous known pressure, particularly without much assistance from an operator or technician.

Another problem which exists in the prior art is the unavailability of a simple structured pipette sampler which is so inexpensive that it can be thrown away after only a few uses without economic disadvantage. At the present time, adjustable volume pipettes are so expensive that throwing them away is not practical; in part this is so because of the needed presence of additional elements and the design and construction of other elements.

No adjustable volume pipette sampler has previously been available for allowing an experienced or inexperienced operator to reliably, rapidly and easily dispense therefrom and/or aspirate thereinto an accurate quantity of liquid repeatedly, constituting as well pressure-generating means for use in dispensing samples in conjunction with HPLC, GC, absorption columns, filters or whenever a measured sample must be forced into another device under a continuous predetermined pressure, particularly without much assistance from an operator or technician.

Additionally, there is a great need for a pressure-producing pipette sampler which prevents sample contact with the plunger to assure a contamination-free environment during subsequent sampling, as well as an indicia dual scale on the pipette barrel to indicate sample volume and sample pressure.

Attention is invited to copending application Ser. No. 894,809 which concerns somewhat related subject matter, the contents of such copending application being incorporated herein by reference.

SUMMARY OF THE INVENTION

Accordingly, it is an object of the present invention to overcome deficiencies of the prior art such as those set forth above. Another object is to provide for improved sampling procedures and the like, especially in conjunction with filtering, absorption and/or chromatography.

It is a further object of the present invention to provide an improved self-contained pressure-producing, adjustable volume, pipette sampler.

It is another object of the present invention to provide an improved pressure-producing, adjustable volume, pipette sampler for use in dispensing samples in conjunction with HPLC, GC, absorption columns or cartridges, filtration or the like.

It is still another object of the present invention to provide a sampling and pressure-generating device which eliminates tedium inherent in prior hand-held devices and makes it possible for an operator to run many columns or filtrations at the same time, each with its own sampling and pressure-generating devices, each sampling a measured volume and generating an optimum pressure for the needed application.

It is still a further object of the present invention to provide an adjustable volume, pressure-generating pipette sampler which can be utilized by both experienced and inexperienced operators to dispense and/or aspirate accurate quantities of liquids therefrom.

It is yet another object of the present invention to provide an inexpensive, adjustable or fixed volume, pressure-generating pipette sampler which can dispense and/or aspirate accurate amounts of liquids, and if desired, under a continuous predetermined pressure without constant attention from an operator or technician.

It is yet a further object of the present invention to provide an inexpensive adjustable volume pressure generating pipette sampler which can dispense accurate amounts of liquids therefrom repeatedly, easily and rapidly.

It is still another object of the present invention to provide an adjustable volume pressure-generating pipette sampler which is equipped with a notched plunger shaft and a stop disc for mating with the notches, to precisely fix the location of the plunger.

It is another object of the present invention to provide an adjustable volume pressure-generating pipette sampler having a barrel equipped with a dual scale, such as by calibration indicia printed thereon.

It is still another object of the present invention to provide an adjustable volume pressure-generating pipette sampler having means for coupling or incorporating accessories, such as a stopcock and/or filtering columns, to or at the pipette dispensing end.

It is another object of the present invention to provide a disposable and/or reusable adjustable volume pressure-generating pipette sampler which is of simple and inexpensive construction and which can nevertheless dispense accurate quantities of liquid.

It is still another object of the present invention to provide an such adjustable volume pressure-generating pipette sampler further having a translucent of transparent barrel to visually indicate to an operator the position of the plunger shaft within the barrel.

In its simplest form, the device is a modified disposable syringe which draws a measured volume liquid sample to partially fill a chamber, with the remaining air above the sample being compressed to develop a selected pressure to drive the liquid sample unattended through a column, filter or another device at the end of the syringe. The modified syringe may be used to hold the liquid sample directly therewithin, in which case the syringe must be cleaned between samples to prevent crossover contamination. The device may alternately be used with an attached disposable tip, e.g. another syringe barrel, to hold the sample in which case there is no crossover or contamination, because then a new tip is used with each sample and the liquid sample does not enter the main syringe itself.

Still other objects, features and attendant advantages of the present invention beyond those mentioned above will become apparent to those skilled in the art form the following detailed description of certain preferred embodiments constructed in accordance therewith, taken in conjunction with the accompanying drawings, therein:

BRIEF DESCRIPTION OF THE DRAWINGS

FIG. **8*a* is an elevational view of an accessory filter attachment employed in the present invention.

DETAILED DESCRIPTION OF PREFERRED EMBODIMENTS

Figure 1:
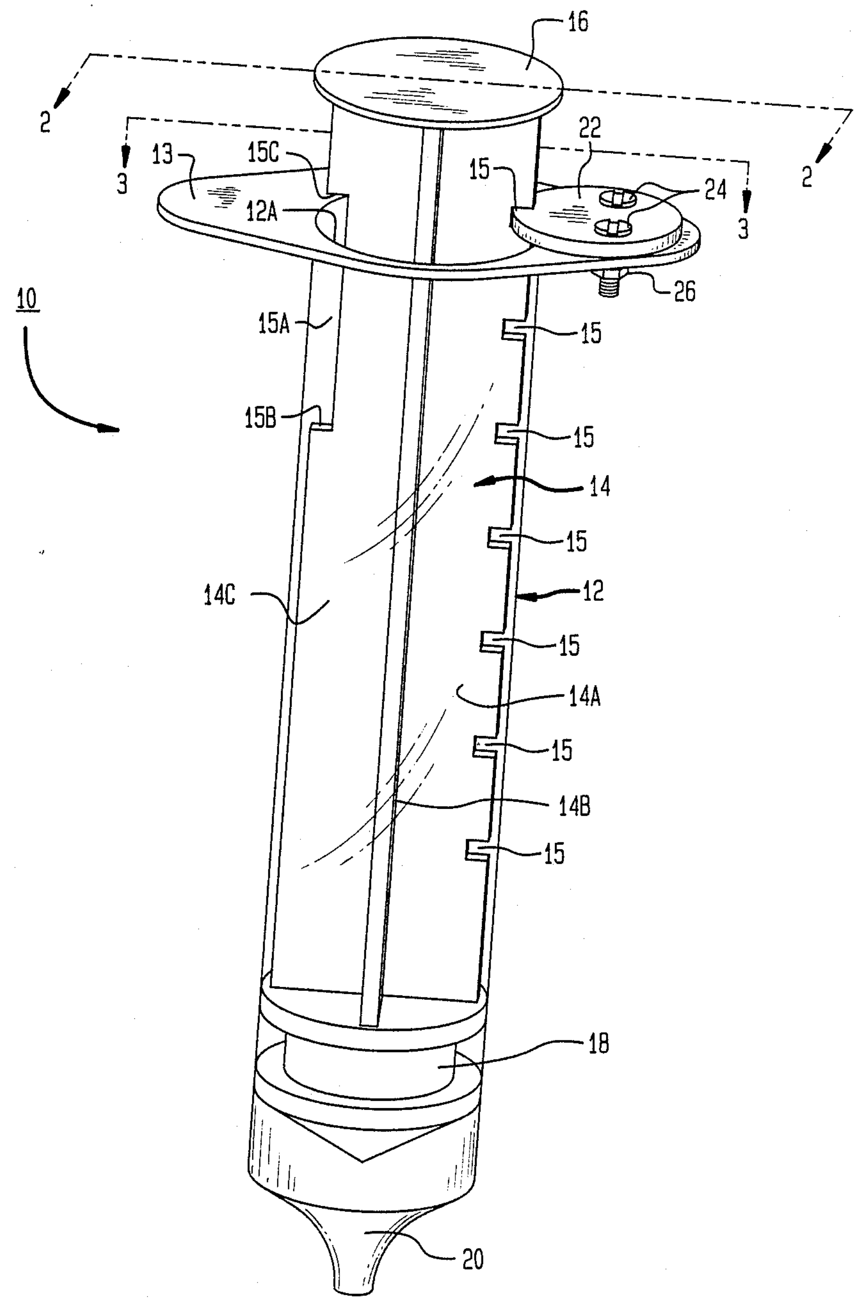
FIG. 1 is a perspective view of an adjustable volume pressure-generating pipette sampler in accordance with the present invention.
Figure 2:
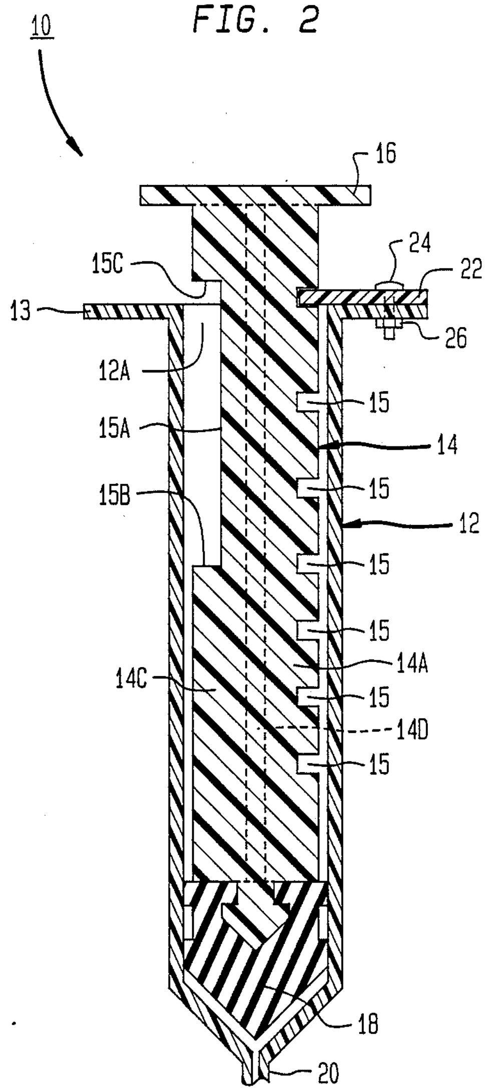
FIG. 2 is a cross-sectional view of the adjustable volume pressure-generating pipette sampler taken along line 2—2 in FIG. 1.

The presently preferred embodiment 10 of a syringe in accordance with the present invention is illustrated in FIGS. 1 and 2 of the drawings. The syringe 10 comprises the combination of a typical tubular barrel 12, a uniquely notched plunger shaft 14 having a cruciform cross-sectional configuration adapted for axial movement within the barrel 12, and a generally planar stop disc 22 for fixing the axial position of the plunger 14 within the barrel 12. The stop disc 22 is suitably mounted on a flange 13 at the upper end ot the barrel 12.

Figure 6:
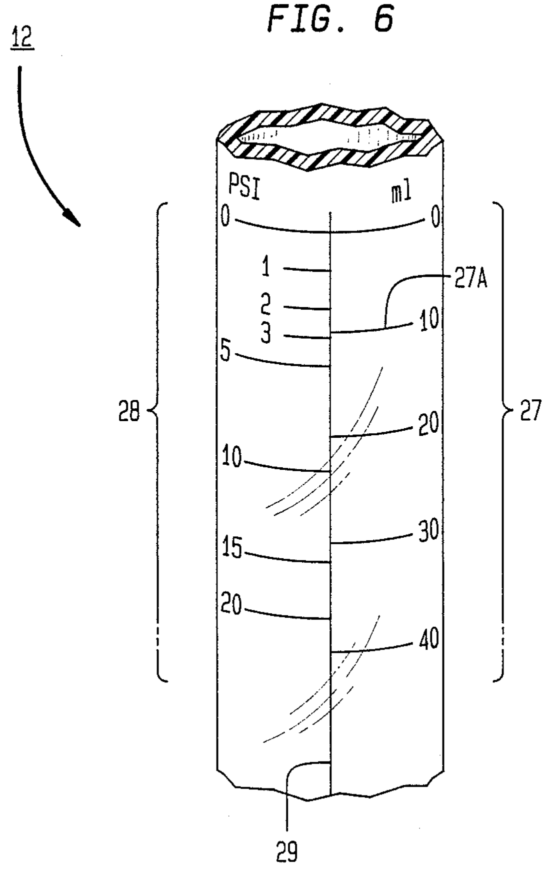
FIG. 6 is a partial perspective view of the barrel indicia dual scale employed in the present invention.

The barrel 12 includes a tubular body having a lower dispensing end 20 and an upper plunger receiving opening **12*a*. The planar flange 13, which acts as a finger grip, is integrally formed with the barrel 12 at its upper end surrounding the opening 12*a* and extends generally in a plane perpendicular to the longitudinal axis of the barrel 12. The barrel 12 is also desirably provided with dual calibration indicia printed on the barrel's peripheral surface, as shown in FIG. 6** and discussed in detail below.

The barrel 12 is adapted to receive the cross-shaped plunger shaft 14 through the opening 12*a* for axial movement of the plunger therein. The plunger includes at the bottom end of the shaft 14 an integrally formed, preferably snap-on fitted plunger tip 18 in the nature of an elastomeric piston or sliding seal for sliding, sealing contact with the interior of the barrel 12. A generally planar thumb depressing button 16 is integrally formed with the plunger shaft 14 at its upper end, the button 16 preferably being in a plane perpendicular to the longitudinal axis of the plunger and barrel. The button 16 can also serve as control means to effect manipulation of the plunger. The plunger shaft 14 includes a plurality, preferably four, radially extending flanges 14*a*–14*d* which form its cruciform configuration, each flange being located at approximately 90° angles to its neighboring flanges.

The plunger shaft flange 14*a* has a plurality of cut-away portions or notches 15 selectively, e.g. equidistantly, spaced along the vertical edge thereof. If desired, one or more of the other plunger shaft flanges may also be provided with appropriate similarly spaced notches. In addition, plunger shaft flange 14*c*, spaced 180° from the flange 14*a* and its notches 15, may include a single elongated notch 15*a* cut into its edge along its length. The elongated notch 15*a* includes an upper shoulder or plunger stop 15*c* and a lower shoulder or plunger atop 15*b*. If present, the elongated notch 15*a* may instead be cut into the shaft flanges 14*a* or 14*d*. It should be understood that all of the notches 15 and 15*a* have upper and lower edges, including the shoulders 15*b* and 15*c*, which desirably extend perpendicular to the axis of the barrel and plunger.

As noted above, the stop disc 22 is mounted to the finger-grip flange 13 of the barrel 12, and this mounting may be effected by means of a pair of off-center disc mounting rivets, screws or bolts 24, 24 which securably fasten the disc 22 to the flange 13 in a plane parallel to the flange and perpendicular to the axis of the syringe 10. In the illustrated embodiment, the disc 22 is flush with and touches the surface of flange 13. If the fasteners 24, 24 are bolts, there are also provided threadably fastened nuts 26, 26 to aid in mounting the disc 22 to flange 13. The disc 22 may be circular and generally planar as illustrated, although other configurations also are possible.

The barrel 12, the plunger 14 and the disc 22 are all made of generally rigid plastic material such as polymethylmethacrylate (e.g. Lucite or Plexiglas), polycarbonate, polyacetal, polystyrene, nylon or other suitable material which possesses inertness and strength at normal temperatures of use, and the barrel should be transparent or at least translucent as well. It should be understood that the disc 22 may be formed of a metallic material as are the fasteners 24, while the barrel may be formed of glass.

As can be seen in FIGS. 1 and 2, the disc 22 is adapted to mate with at least one notch 15 in the flange 14*a* in a first mode position. Also see FIG. 3. When the disc is adjacently mated with one of the notches 15, it can be seen that the plunger 14 becomes fixed and will not axially travel within the barrel 12. The disc 22 thus acts as a stop means for retaining the plunger 14 at a fixed location relative to the axis of the barrel 12.

Figure 4:
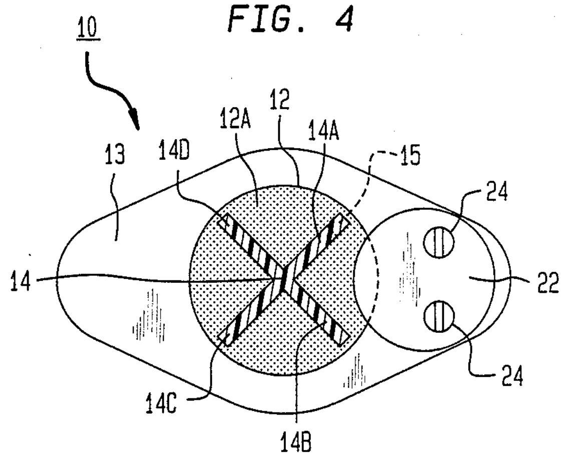
FIG. 4 is a cross-sectional view of the adjustable volume pressure-generating pipette sampler taken along line 3—3 in FIG. 1, illustrating the plunger shaft straddling the stop disc employed in the present invention.

Referring now to FIG. 4 which shows the plunger shaft 14 in a second mode position, the plunger shaft 14 is rotated approximately 45° to allow the flanges 14*a* and 14*b* to straddle the disc 22 thereby permitting the plunger to readily and freely move axially as controlled by an operator or technician. In the second mode position as shown in FIG. 4, the syringe is used in a conventional way to aspirate a sample into the barrel or into a coupled syringe barrel connected there below to the barrel outlet 20—and/or to dispense the sample therefrom. This second mode position is also used to move between notches 15, the latter of which permit use of the syringe 10 according to the first mode, discussed below.

If it is desired to dispense a relatively large fixed volume of liquid, then the plunger should be rotated 180° to permit the disc 22 to register with the cut-away portion 15*a* of the flange 14*c*. This provides a third mode position for use similar to that of Shapiro U.S. Pat. No. 4,601,212. When the upper shoulder or stop 15*c* contacts or abuts disc 22, the downward axial travel of the plunger stops; and when the lower shoulder or stop means 15*b* contacts or abuts the disc 22, the plunger is limited in its upward axial travel.

Figure 3:
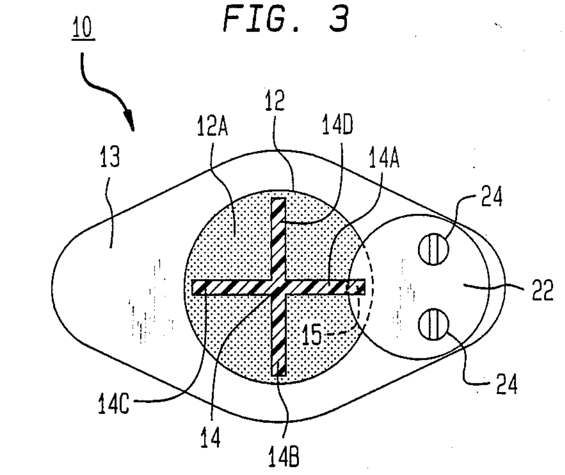
FIG. 3 is a cross-sectional view of the adjustable volume pressure-generating pipette sampler taken along line 3—3 in FIG. 1, illustrating the plunger shaft engaging a stop disc.

As will be readily understood, the disc 22 must have a working edge thickness only slightly less than the thickness of the notches 15 and a working edge shape to permit movement of the plunger shaft 14 to the first and second mode positions, as shown in FIGS. 3 and 4, e.g. a disc diameter slightly less than the peripheral radial distance between adjacent flanges to allow the straddling of the disc 22 between the flanges, as shown in FIG. 4. The disc 22 may take any shape and may be attached to the barrel 12 at another location; however, the illustrated position is advantageous because of its simplicity of construction, and it also permits insertion and withdrawal of the plunger without removal of the disc 22.

Figure 5:
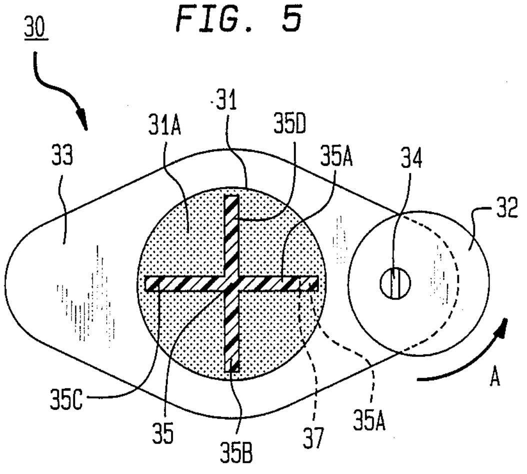
FIG. 5 is a cross-sectional view of the adjustable volume pressure-generating pipette sampler, illustrating an alternate embodiment of the stop disc used in the present invention.

In an alternate embodiment (see FIG. 5), the syringe or pipette sampler 30 includes a finger-grip flange 33 having mounted thereto a rotatable stop disc 32. The plunger shaft 35 includes shaped flanges 35*a*–35*d*, wherein at least one flange includes equidistantly spaced apart notches 35*a* for adjacently mating with stop disc 32, just as in the first described embodiment 10. As can be seen, the rotatable disc 32 is mounted eccentrically, i.e. off-center, by a single rivet, screw or bolt 34 which serves as a pivot axis so that when the disc 32 is pivoted about the mounting means 34 in a direction as indicated by arrow A, the working edge of the disc will be removed from an engaging position with notch 35*a* thereby allowing the plunger to be axially moved freely without rotation thereof.

While the notches on the plunger flanges are shown and described as being equidistantly spaced-apart along the vertical edges thereof, it should be understood that various other positioned and located notches are possible.

Figure 7:
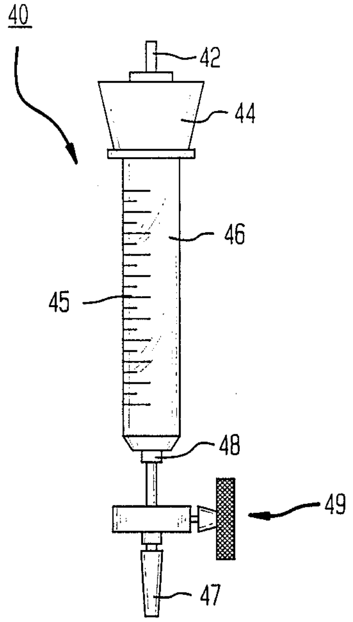
FIG. 7 is an elevational view of a stopcock attachment employed in the present invention.

Referring now to FIG. 6, the barrel 12 desirably includes on its peripheral surface calibration indicia 29 to visually inform an operator of the position and location of the plunger within the barrel. The barrel, being made of transparent or at least translucent material, enables the operator or technician to see the interior of the barrel and the plunger position. The indicia permits calibration of the barrel in either pressure units (e.g. psi)

or in volume units such as in milliliters (ml). The milliliter scale 27 indicates the actual milliliters of sample drawn into a reservoir 46 (such as shown in FIG. 7). The zero point of the ml scale is at the uppermost position of the plunger shaft. The zero of the psi scale 28 is also at this position. A sample volume line 27*a* on the ml scale indicates the amount of sample to be drawn for the pressure scale to read psi correctly as that volume defines the volume of air above the sample, VB in the following formula.

If VB=Volume of air in ml between the plunger tip 18 in its uppermost position and the drawn sample (volume before), and P=p.s.i. developed by moving the plunger to its most downward position, X=Locked position of plunger, expressed in ml on the ml scale, and VA=Volume of air between plunger tip 18 and sample, after pressure has been generated by moving the plunger to its most downward position (volume after), Then:

$$P = \frac{15VB}{VA} - 15 \text{ (Boyle's Law)}$$

$$VA = VB - X$$

$$P = \frac{15VB}{VB - X} - 15$$

With VB and X known, the pressure scale may be constructed.

Figure 8A:
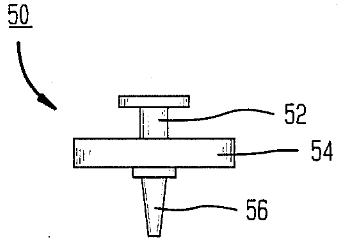
FIG. 8*b*** an elevational view of a chromatography column employed in the present invention.

Referring now to FIGS. 7 and 8*a*, the pipette sampler of the present invention is particularly useful as a simple pressure-generating means for forcing liquids or reagents under an initial known pressure of up to 45 psi through filters or columns, or other devices, unattended by an operator, according to the first mode of use mentioned briefly above.

A valved reservoir shown generally at 40 may be a secondary syringe as mentioned above, and includes an air-tight, pressure holding coupling fitting 42, 44 (sucn as a LUER-LOK), a dispensing end 47, a reservoir barrel 46 having volume indicia 45 printed thereon, and a cut-off valve 49 such as a stopcock, the valve being manually operable to either permit or not permit the passage of fluid therethrough. Alternatively, the cut-off valve 49 may be attached directly to the tip 20 of the main syringe 10 for some uses.

In addition, the pipette or syringe 10 or 30 may also include a filtering attachment 50, including a coupling fitting 52 (such as a LUER-LOK), a filter housing 54, and a dispensing end 56. The fitting 52 is desirably attached to the tip 47 of the valve 49. The pipette/syringe 10 or 30 may be used to hold the samples directly within its barrel, in which case the valve 49 is connected to the tip 20 as mentioned above. In this case, the barrel 12 must be cleaned between samples to prevent contamination crossover; therefore, it is preferred to incorporate an attached disposable tip or reservoir, such as shown in FIG. 7, to prevent contamination of the main barrel 12. In the preferred combination, the tubular barrel 12, which should have a substantially greater capacity than the barrel 45 (preferaby 5–10 times its capacity), is primarily used for displacing volumes of air which draw up and discharge equal volumes of reagent from the outlet 47 of the reservoir, thereby functioning as an air-displacement pipette. An advantage of an air-displacement pipette is that it allows no reagent sample to enter the main barrel 12, thus permitting repeated re-use of the main syringe/pipette 10 or 30 while keeping subsequent samples contaminant free; in other words, a cushion of air is always present between the sample and the pipette plunger tip 18.

Figure 8B:
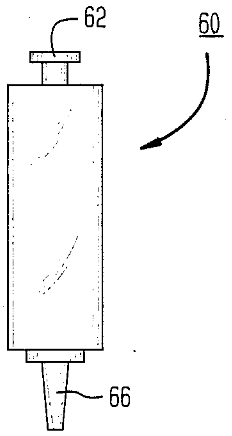

FIG. 8*b* shows a chromatography or absorption column 60 having an air-tight coupling means 62 at its upper end and a dispensing tip 66 at its lower end. The syringe/pipette 10, 30 can be used with such a device by coupling the tip 47 of the valve 49 with the air-tight coupler 62 as follows. The pipette first draws a measured volume of reagent or sample from a source to partially fill a chamber, e.g. accessory reservoir 46 as shown in FIG. 7, and the stopcock 49 is closed. The tip 47 of the valve 49 is attached to the coupling means 62, and the plunger is depressed and locked into place in a selected notch 15 to compress the air above the sample or reagent to a selected pressure to subsequently drive the sample through a column, filter or the like, unattended, upon opening of the stopcock.

In more detail, the plunger 14 is set or moved to a selected volume of a sample to be drawn (see FIG. 6), for example 10 ml, and with the valve 49 open. The tip 47 of the valve 49 is then lowered into a sample reagent and then the plunger is raised to the zero mark on both indicia calibration scales, filling the reservoir 46 (FIG. 7) with 10 ml of the sample reagent. The shut-off valve 49 is next closed and the plunger 14 is lowered, noting the pressure scale, to a selected pressure and to a greater volume than the sample, for example to 15 psi on the psi scale, and the plunger is then rotated so that the disc 22 engages a slot 15 to maintain the selected pressure (e.g. 15 psi). Next, the intended column 60 or filter 50 is attached via an air-tight connector 52 or 62 to the outlet 47 of the valve 49 and the assembly is placed in a rack, or other support above a receiving container to collect the filtered or otherwise altered sample or reagent. The valve 49 is opened to start the filtering, absorption or chromatography operation which can be left unattended to proceed to completion.

Another feature of the invention is its ability to duplicate with little possibility of mistake the exact volumes and pressures for the highest efficiency during use. Once the pressure/volume relationship has been determined for a specific reagent system (sample plus solvent), the scale on the barrel 12 may have only volume marking and only one notch 15 on the plunger for pressure. This feature makes it possible to provide a kit with cartrige, solvent and syringe 10 for a single test, and with assurance of satisfactory results.

It should be understood that the pipette/syringe 10, 30 described can also be utilized as a fixed-volume syringe for medical use by attaching a conventional syringe needle to the pipette's dispensing end 20. Furthermore, even though the pipette device of the present invention is very inexpensive, this being one of its main attributes, it can also be repeatedly reused if desired.

It will be obvious to those skilled in the art that various changes and modifications may be made without departing from the scope of the invention and the invention is not to be considered limited to what is shown in the drawings and described in the specification.

What is claimed is:

1. An adjustable volume pressure-generating pipette sampling device, primarily useful for dispensing and/or aspirating a predetermined, accurate, fixed volume quantity of liquid under a known pressure, unattended, comprising:

tubular liquid reagent-holding means having a longitudinal axis, a lower dispensing end and an upper opening, and a finger-grippable region;

a removable liquid reagent outlet accessory means secured to said dispensing end;

a plunger shaft assembly having a central axis, a lower end and an upper end, said lower end having an integrally formed plunger thereon and said upper end having an integrally formed finger-depressible region thereon, said shaft being rotatable about its central axis and including at least two 180° apart integrally formed radially extending flanges adapted to extend the entire longitudinal length of said shaft, a first flange including on its vertical edge at least two spaced apart notches therein, a second flange including at least one notch along its vertical edge adapted to extend at a distance generally equal to the distance between two notches on said first flange, said notch on said second flange including an upper plunger limiting travel means and lower plunger limiting travel means;

plunger shaft stop disc means, immovably mounted to said finger-grippable region, for engagement within said one of said notches to retain said plunger shaft at a fixed predetermined axial position; and calibration indicia scale provided on the peripheral surface of said tubular fluid holding means and correlated to said at least two spaced apart notches to indicate the position of said plunger shaft within said tubular liquid reagent holding means.

2. An adjustable volume pipette sampler in accordance with claim 1, wherein said plunger shaft stop disc means has a thickness substantially equal to but slightly smaller than the thickness of said notches.

3. An adjustable volume pipette sampler in accordance with claim 1, further including another set of two radially extending flanges integrally formed to said plunger shaft perpindicular to said first two flanges so as to define a cruciform cross-section.

4. An adjustable volume pipette sampler in accordance with claim 1, wherein said plunger shaft stop disc means is a generally planar circular member.

5. An adjustable volume pipette sampler in accordance with claim 1, wherein said tubular liquid reagent holding means is formed of a translucent plastic material.

6. An adjustable volume pipette sampler in accordance with claim 1, wherein said removable liquid reagent outlet accessory means comprises a filter.

7. An adjustable volume pipette sampler in accordance with claim 1, wherein said removable liquid reagent outlet accessory means comprises a valved fluid holding reservoir.

8. An adjustable volume pipette sampler in accordance with claim 1, wherein said notches are cut into said flanges perpendicular to said longitudinal axis of said tubular liquid reagent holding means.

9. An adjustable volume pipette sampler in accordance with claim 1, wherein said plunger shaft stop disc means is mounted to said finger-grippable region via two off-center mounted screws.

10. An adjustable volume pressure-generating sampler kit for a specific reagent system, comprising a syringe including a transparent or translucent barrel capable of receiving liquid reagent therein, said barrel having a lower discharge opening and an open upper end, and a plunger movable axially within said barrel and rotatably therewithin about a central axis.

said plunger having a power end for sealing engagement with the interior of said barrel, and a plunger shaft having a plurality of flanges extending both axially and radially, each flange ending in an outside edge, said plunger shaft projecting upwardly through the open upper end of said barrel and having control means at the upper end thereof to effect manipulation of said plunger;

pressure-generating means for effecting and initially maintaining a selected elevated pressure within said barrel below said plunger, comprising:

(1) at least one of said flanges of said plunger shaft having a plurality of open ended notches extending radially toward the central axis of said plunger, said notches being spaced axially along the length of said plunger at preselected distances corresponding to a series of at least preselected volumes or pressures;

(2) stop means fixed to said barrel for cooperation with said notches of said plunger shaft, said stop means including a generally planar working edge of thickness only slightly less than the thickness of said notches, said generally planar working edge being adapted to extend into and cooperate with a selected said notch in a first operating position, and in a second operating position said planar working edge lying free of the outside edge of the plunger shaft flange containing said notches so that said generally planar working edge of said stop means does not lie within any said notch, said stop means and said plunger being so constructed that movement between said first and second operative positions is effected by relative rotation between said stop means and said plunger; and (3) air-tight valve means for opening and closing egress to said discharge opening of said barrel, said air-tight valve means having an inlet and a discharge tip;

a pair of calibration indicia scales on said barrel correlated to said notches to indicate the axial position of said plunger in units of both volume and pressure.

11. A pressure-generating sampler according to claim 10, wherein said stop means is mounted on said barrel at the upper end thereof where said plunger shaft projects from said barrel.

12. A pressure-generating sampler according to claim 11, wherein said stop means comprises a generally flat disc with said working edge projecting toward the central axis of the barrel.

13. A pressure-generating sampler according to claim 11, wherein said stop means comprises a disc rotatably mounted along a pivot axis to said barrel so that said working edge can be rotated into the path of said plunger shaft in the first operating position, and rotated out of the path of said plunger shaft to avoid engagement with a said notch in the second operating position.

14. A pressure-generating sampler according to claim 10, further comprising a secondary barrel mounted in an air-tight way between said discharge opening and said air-tight valve means.

15. A pressure-generating sampler according to claim 10, furtner comprising a chromatography column coupled to the tip of said valve means.

16. An adjustable volume pressure-generating sampler according to claim 10 wherein said stop means is immovably fixed to said barrel.

17. An adjustable volume pressure-generating sampler kit for a specific reagent system, comprising a syringe including a transparent or translucent barrel and a plunger therewithin, said barrel having a lower discharge opening and an open upper end, said plunger being movable axially within said barrel and rotatably therewithin about a central axis;

said plunger having a lower end for sealing engagement with the interior of said barrel, and a plunger shaft having a plurality of flanges extending both axially and radially, each flange ending in an outside edge, said plunger shaft projecting upwardly through the open upper end of said barrel and having control means at the upper end thereof to effect manipulation of said plunger;

at least one of said flanges of said plunger shaft having an open ended notch extending radially toward the central axis of said plunger, said notch being located axially along the length of said plunger at preselected distance corresponding to a preselected volume or pressure;

stop means immovably fixed to said barrel for cooperation with said notch of said plunger shaft, said stop means including a generally planar working edge of thickness only slightly less than the thickness of said notch, said generally planar working edge being adapted to extend into and cooperate with said notch in a first operating position, and in a second operating position said planar working edge lying free of the outside edge of the plunger shaft flange containing said notch so that said genrally planar working edge does not lie within said notch, said stop means and said plunger being so constructed that movement between said first and second operative positions is effected by relative rotation between said stop means and said plunger;

air-tight valve means for opening and closing egress to said discharge opening of said barrel, said air-tight valve means having an inlet and a discharge tip;

calibration indicia scales on said barrel correlated to said notches to indicate the axial position of said plunger in volume units, further comprising a second calibration indicia scale on said barrel to indicate the axial position of said plunger in pressure unit; and a chromatography column for coupling with the discharge tip of said valve means.

* * * * *